(12) United States Patent
Rand et al.

(10) Patent No.: US 8,375,120 B2
(45) Date of Patent: Feb. 12, 2013

(54) DOMAIN NAME SYSTEM SECURITY NETWORK

(75) Inventors: David Rand, Kihei, HI (US); Scott D. Esters, San Francisco, CA (US); Paul Moriarty, San Jose, CA (US); Jerry Scharf, Palo Alto, CA (US)

(73) Assignee: Trend Micro Incorporated, Tokyo (JP)

( * ) Notice: Subject to any disclaimer, the term of this patent is extended or adjusted under 35 U.S.C. 154(b) by 1992 days.

(21) Appl. No.: 11/437,912

(22) Filed: May 19, 2006

(65) Prior Publication Data

US 2007/0118669 A1 May 24, 2007

Related U.S. Application Data

(60) Provisional application No. 60/739,889, filed on Nov. 23, 2005.

(51) Int. Cl.
*G06F 15/173* (2006.01)
(52) U.S. Cl. ...................................... 709/224
(58) Field of Classification Search ............... 709/224
See application file for complete search history.

(56) References Cited

U.S. PATENT DOCUMENTS

| | | | |
|---|---|---|---|
| 5,623,600 A | 4/1997 | Ji et al. | |
| 6,332,158 B1 * | 12/2001 | Risley et al. | 709/219 |
| 6,530,024 B1 * | 3/2003 | Proctor | 726/23 |
| 2002/0059396 A1 * | 5/2002 | Holzer et al. | 709/217 |
| 2002/0184190 A1 | 12/2002 | Sugiura | |
| 2004/0015719 A1 * | 1/2004 | Lee et al. | 713/201 |
| 2004/0177247 A1 | 9/2004 | Peles | |
| 2004/0255161 A1 | 12/2004 | Cavenaugh | |
| 2005/0114508 A1 * | 5/2005 | DeStefano | 709/224 |
| 2005/0188221 A1 * | 8/2005 | Motsinger et al. | 713/201 |
| 2005/0204169 A1 | 9/2005 | Tonnesen | |
| 2006/0146870 A1 * | 7/2006 | Harvey et al. | 370/466 |
| 2006/0187820 A1 * | 8/2006 | French | 370/227 |
| 2007/0160200 A1 * | 7/2007 | Ishikawa et al. | 380/30 |

OTHER PUBLICATIONS

Keisuke Ishibashi, et al., and Masahiro Ishino, et al., "Detecting Mass-Mailing Worm Infected Hosts by Mining DNS Traffic Data", Sigcomm 2005 Workshops, Aug. 22-26, 2005, ACM, PA, USA.
Antoine Schonewille and Dirk-Jan Van Helmond, "The Domain Name Service as an IDS—How DNS can be used for detecting and monitoring badware in a network", Surfnet, Feb. 5, 2006, University Van Amsterdam, USA.
P. Mockapetris, "Domain Names—Implementation and Specification" ISI Nov. 1987. Webpage [online] [retrieved on Apr. 22, 2006]. Retrieved from the internet<URL:http://www.ietf.org/rfc/rfc1035.txt>.

(Continued)

*Primary Examiner* — Boris Gorney
(74) *Attorney, Agent, or Firm* — Okamoto & Benedicto LLP

(57) ABSTRACT

In one embodiment, a DNS security network includes several DNS appliances and a security operations center (SOC) server computer. The SOC server computer may receive telemetry data from the DNS appliances, the telemetry data comprising information about DNS client queries received in the respective DNS appliances. From the telemetry data, the SOC server computer may generate security policies for distribution to the DNS appliances. The security policies may be used by the DNS appliances to determine whether a DNS client query is originated by a client computer performing a prohibited activity (e.g., sending spam, communicating with a zombie control computer, navigating to a prohibited website, etc.). An answer to a client query may be replaced or discarded altogether in cases where the originator is performing a prohibited activity.

12 Claims, 6 Drawing Sheets

OTHER PUBLICATIONS

Simplicita: Carrier Scale Internet Applications Infrastructure, 27 sheets. Webpage [online] [retrieved on Jun. 1, 2006]. Retrieved from the internet<URL:http//www.simplicita.com>.

International Search Report for International Application No. PCT/US06/45142 (2 sheets).

The Register® Biting the hand that feeds IT "Trend Micro to kick butt on botnets", Sep. 26, 2006, 4 sheets; Webpage [online] [retrieved on Sep. 29, 2006]; Retrieved from the Internet: http://www.theregister.com/2006/09/26/trend_micro_botnet_appliance/print.html.

2006 Press Releases, "Trend Micro Takes Unprecedented Approach to Eliminating Botnet Threats with the Unveiling of InterCloud Security Device", Sep. 25, 2006, 3 sheets; Webpage [online] [retrieved on Sep. 29, 2006]; Retrieved from the Internet: http://www.trendmicro.com/en/about/news/pr/archive/2006/pr092506.htm.

* cited by examiner

DOMAIN NAME SYSTEM SECURITY NETWORK

CROSS-REFERENCE TO RELATED APPLICATION

This application claims the benefit of U.S. Provisional Application No. 60/739,889, filed Nov. 23, 2005, which is incorporated herein by reference in its entirety.

BACKGROUND OF THE INVENTION

1. Field of the Invention

The present invention relates generally to computer networks, and more particularly but not exclusively to computer network security.

2. Description of the Background Art

The widespread accessibility of public computer networks, such as the Internet, has enabled users from around the world to efficiently communicate with one another and access vast amounts of information. For example, a user employing a client computer with a Web browser can log onto the Internet to download files, send and receive emails, read web pages from websites, and so on. Unfortunately, the Internet not only attracts legitimate users but those with malicious intentions as well.

Malicious users on the Internet, also collectively referred to herein as "hackers," write and propagate malicious codes, such as computer viruses, worms, Trojans, and spyware. Hackers also hijack legitimate websites, steal Internet Protocol (IP) addresses, and redirect users to malicious websites. The malicious activities of hackers, and the damages they cause, are well-known. Antivirus software and firewall technologies may be employed as protective measures against malicious activities. However, while these protective measures are effective for the most part, they need to be augmented or improved to combat the ever increasing sophistication of hackers.

SUMMARY

In one embodiment, a DNS security network includes several DNS appliances and a security operations center (SOC) server computer. The SOC server computer may receive telemetry data from the DNS appliances, the telemetry data comprising information about DNS client queries received in the respective DNS appliances. From the telemetry data, the SOC server computer may generate security policies for distribution to the DNS appliances. The security policies may be used by the DNS appliances to determine whether a DNS client query is originated by a client computer performing a prohibited activity (e.g., sending spam, communicating with a zombie control computer, navigating to a prohibited website, etc.). An answer to a client query may be replaced or discarded altogether in cases where the originator is performing a prohibited activity.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

Figure 1:
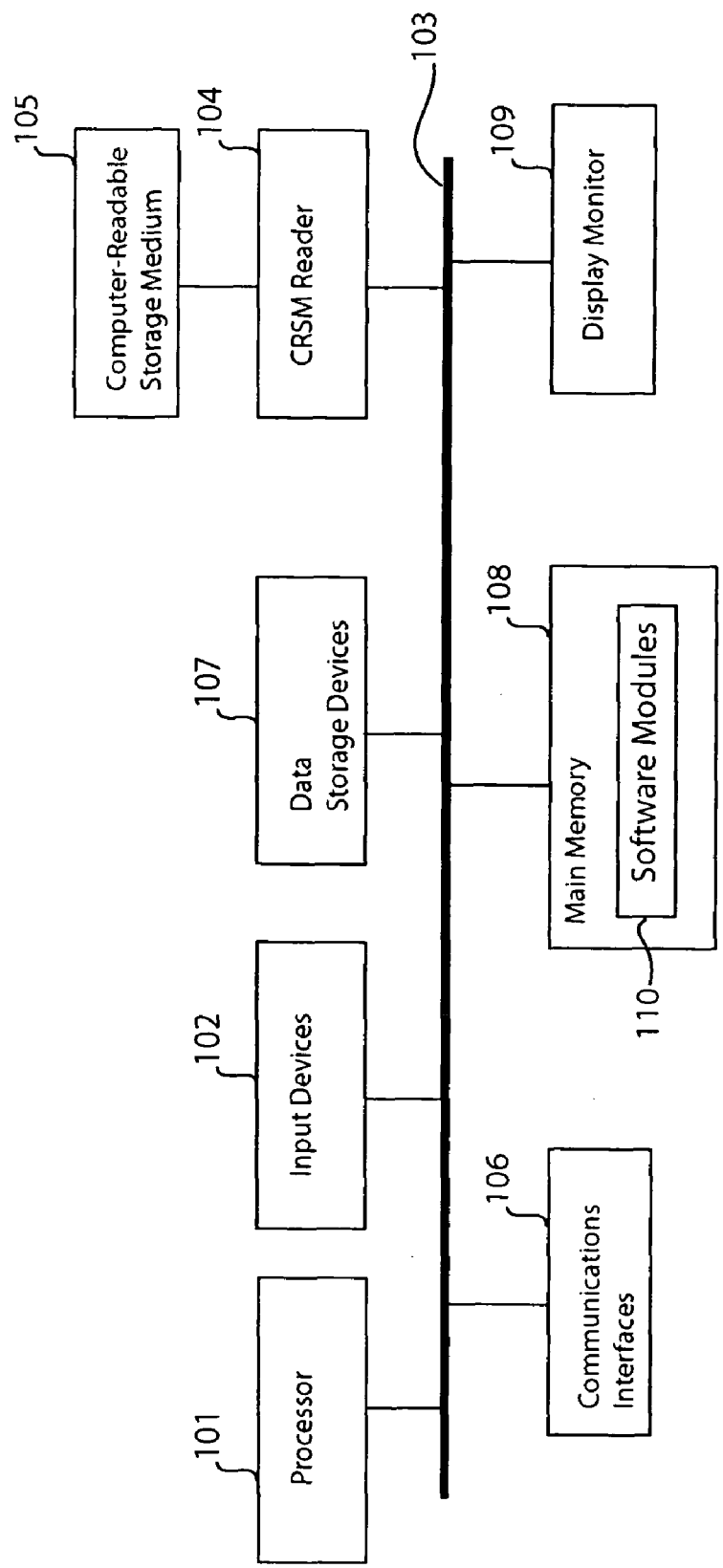
FIG. 1 shows a schematic diagram of an example computer that may be used in embodiments of the present invention.

Referring now to FIG. 1, there is shown a schematic diagram of an example computer that may be used in embodiments of the present invention. The computer shown in the example of FIG. 1 may be employed as a server 260 or an appliance 210 (see FIG. 2), for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., LCD, cathode ray tube, flat panel display), communications interfaces 106 (e.g., network adapters, modems) for communicating over computer networks, one or more data storage devices 107 (e.g., hard disk drive), and a main memory 108 (e.g., RAM). Software embodiments may be stored in a computer-readable storage medium 105 for reading into a data storage device 107 or main memory 108. Software embodiments may also be received over a computer network by way of a communications interface 106. In the example of FIG. 1, main memory 108 includes software modules 110, which may comprise software components of the later described server 260 or appliance 210. The software modules 110 may be executed by the processor 101.

Figure 2:
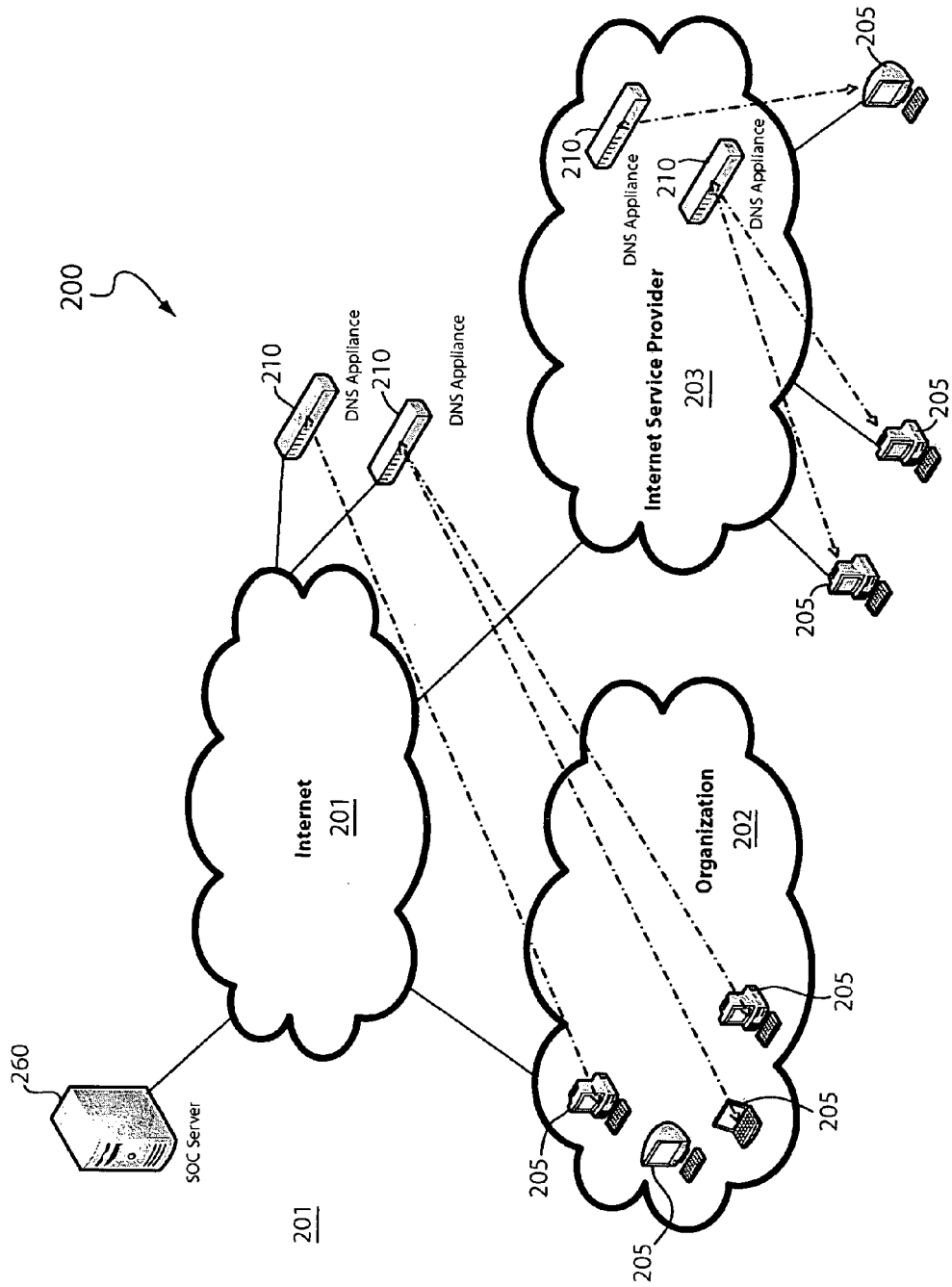
FIG. 2 schematically shows a computer network in accordance with an embodiment of the present invention.

FIG. 2 schematically shows a computer network 200 in accordance with an embodiment of the present invention. The computer network 200 may include a private computer network 202, a service provider network 203, and a public computer network 201. In this and the following examples, the public computer network 201 comprises the Internet and the service provider 203 comprises an Internet Service Provider (ISP), while the private computer network 202 may be that of any organization, such as a company, government entity, or household. Computers in the network 200 may communicate using the Internet protocol.

A domain name system (DNS) appliance 210 may comprise computer hardware, software, and/or firmware components for providing DNS server functionality to subscribing customer computers 205. As is well known, each computer on the Internet has a particular IP address. Because an IP address is cumbersome for use by humans, DNS has been developed to allow use of a domain name instead of an IP addresses to access a site. This enables a user to access or send data to a computer (e.g., a website or mail server) by typing the computer's domain name instead of its IP address. A DNS server allows for translation of domain names to IP addresses. In the example of FIG. 2, a customer computer 205 may query a DNS appliance 210 to find the IP address for a particular domain name. The dashed lines in FIG. 2 represent logical connections between client computers 205 and DNS appliances 210. As will be more apparent below, a DNS appliance 210 may perform conventional DNS services for legitimate client queries, but may perform alternative actions when the query is from an originator that is performing a prohibited activity. DNS, in general, is well known and described in several documents, including IETF RFC 1034 and 1035.

A security operations center (SOC) server 260 may comprise computer hardware, software, and/or firmware components for supporting the operations of the DNS appliances 210. In one embodiment, the server 260 generates security policies that are enforced by the DNS appliances 210. Such security policies may dictate how to detect and respond to DNS client queries that are part of a prohibited activity, such as activities of malicious sources or activities that are against customer-dictated rules. The server 260 may generate security policies based on data gathered and provided by the DNS appliances 210, externally provided feeds, customer inputs, and other sources of threat-related information. As will be more apparent below, the server 260 may aggregate information from a variety of sources to identify malicious activities, generate security policies to combat identified malicious activities, and distribute the generated security policies to the DNS appliances 210. This advantageously allows for a dynamic, global response to network security threats. In one embodiment, the DNS appliances 210 and the server 260 form a DNS security network system that is provided and operated by a single vendor. As shown in FIG. 2, the vendor may provide the DNS and network security services of the DNS appliances 210 and the server 260 to organizations, Internet service providers, and other customers.

Figure 3:
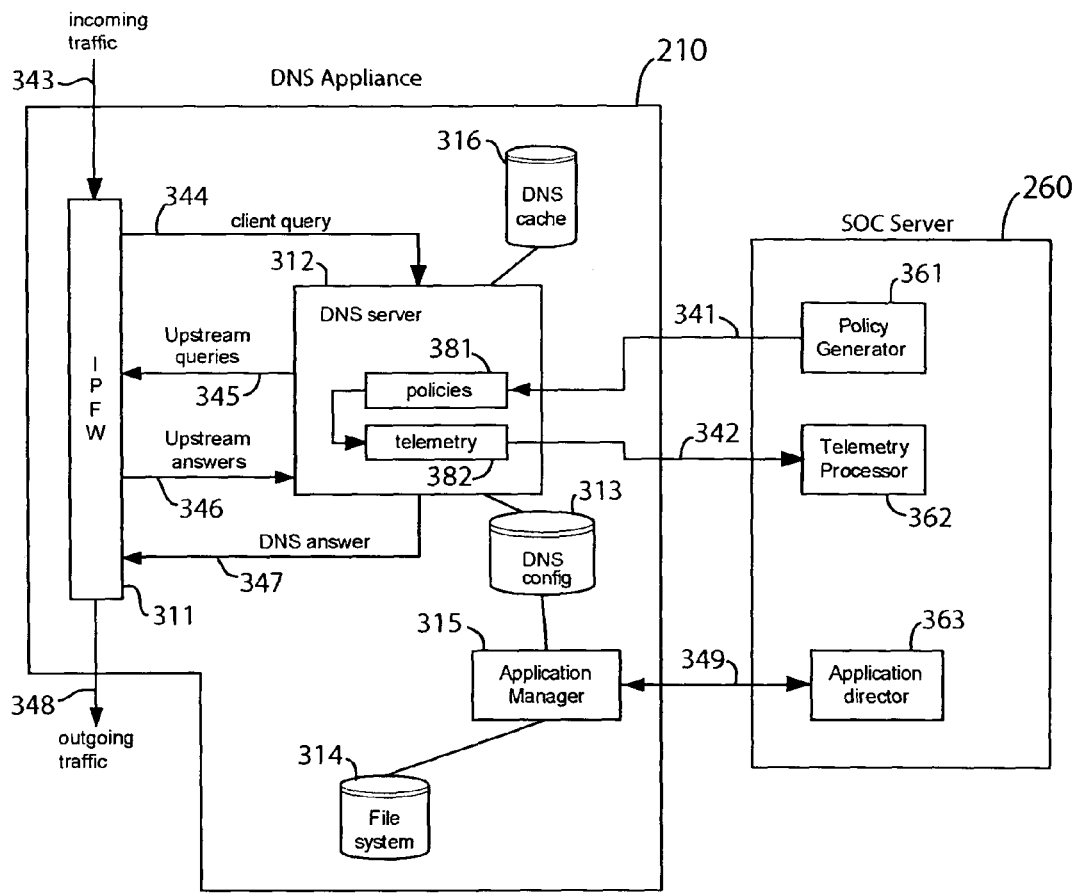
FIG. 3 schematically shows a DNS appliance and a security operations center (SOC) server in accordance with an embodiment of the present invention.

FIG. 3 schematically shows further details of a DNS appliance 210 and a server 260 in accordance with an embodiment of the present invention. In the example of FIG. 3, the DNS appliance 210 comprises an IP firewall (IPFW) 311, a DNS server 312, a DNS configuration 313, a file system 314, an application manager 315, and a DNS cache 316.

The DNS server 312 may comprise computer-readable program code for receiving a DNS client query, for processing the client query based on security policies 381, and for providing telemetry data 382 to the telemetry processor 362 of the server 260. The security policies 381 may be in the form of tables received from a policy generator 361 of the server 260 (see arrow 341). The server 260 may generate the security policies 381 using information from the telemetry data 382 received from the DNS appliance 210 (see arrow 342) and other data sources. In operation, the server 260 receives telemetry data 382 from a plurality of DNS appliances 210, which may be located at various locations throughout the world. A DNS appliance 210 and the server 260 may communicate over the Internet.

The security policies 381 may comprise instructions or information on detecting particular conditions and what to do upon detection of those conditions. In one embodiment, the security policies 381 allow for detection of malicious or prohibited activities. For example, the policies 381 may indicate looking for IP addresses, domain names, or activity patterns associated with or indicative of malicious or prohibited activities and then modifying an answer to the client query if such activities are detected. As another example, a security policy 381 may indicate that if an answer to a client query is an IP address of a malicious site, that answer must be replaced with another answer providing an IP address of a legitimate site. Other examples of policies 381 are provided below. The DNS server 312 enforces the security policies 381 during processing of DNS client queries. The DNS server 312 may enforce the security policies 381 at different stages of processing a DNS client query to take advantage of updated security policies 381 or additional information that is made known as a consequence of processing the query.

In operation, incoming network traffic is received in the DNS appliance 210 by way of the firewall 311 (see arrow 343). The firewall 311 may comprise conventional firewall software. The incoming traffic may include a DNS client query (see arrow 344) from a customer computer 205 (see FIG. 2). The client query may comprise a request to resolve a particular domain name to its associated IP address. More particularly, the client query may contain a request for the "A record" (address record) that contains the IP address of the domain name of interest. The client query may indicate the domain name of interest and the type of resource information desired (e.g., IP address of a mail exchange or Internet web site). An answer to the client query may comprise the IP address of the domain name indicated in the query.

The DNS server 312 may determine an answer to the client query by first inspecting its DNS cache 316, which may comprise a cache of previously generated answers to processed client queries. The DNS cache 316 may be maintained in the memory of the DNS appliance 210 for performance reasons.

If the DNS cache 316 does not contain an answer to the client query, the DNS server 312 may find the answer by sending upstream queries to remotely located recursive or non-recursive DNS servers (see arrow 345), which are collectively referred to herein as "upstream DNS servers." An answer from an upstream DNS server (see arrow 346) may tell the DNS server 312 the IP address of the domain name of interest or information on another upstream DNS server that may know more information about the domain name of interest. The DNS server 312 may continue recursively sending queries to upstream DNS servers and receiving corresponding answers until it receives a "final answer," which provides the IP address of the domain name of interest. The DNS server 312 provides the final answer (see arrow 347) to the originator of the client query: i.e., the customer computer 205 that sent the client query) if it is not against a security policy 381 to do so. Outgoing traffic, such as answers and upstream queries, from the DNS appliance 210 is represented in FIG. 3 by the arrow 348.

Still referring to FIG. 3, the DNS configuration 313 may comprise computer-readable data providing configuration information to the DNS appliance 210. This configuration information may include the IP addresses of customer computers 205 authorized to send DNS client queries to the DNS appliance 210, ports to listen on, listing of root or authoritative name servers, and other configuration/setup-related information. The DNS appliance 210 may receive configuration information from the application director 363 of the server 260 (see arrow 349) by way of the application manager 315. In the example of FIG. 3, the arrows 341, 342, and 349 represent Internet connections between the DNS appliance 210 and the server 260.

The application manager 315 may comprise computer-readable program code for managing applications in the DNS appliance 210. In one embodiment, the application manager 315 facilitates receipt of configuration information from the server 260. The application manager 315 may also control orderly shutdown and boot-up of the DNS appliance 210. The example of FIG. 3 shows the DNS server 312 as the only application running in the DNS appliance 210. It should be understood, however, that the DNS appliance 210 may also run other applications without detracting from the merits of the present invention.

The file system 314 allows for non-volatile data storage in the DNS appliance 210. The operating system components (e.g., FreeBSD operating system) of the DNS appliance 210, the DNS configuration 313, and other data or program code may be stored in and loaded from the file system 314.

Figure 4:
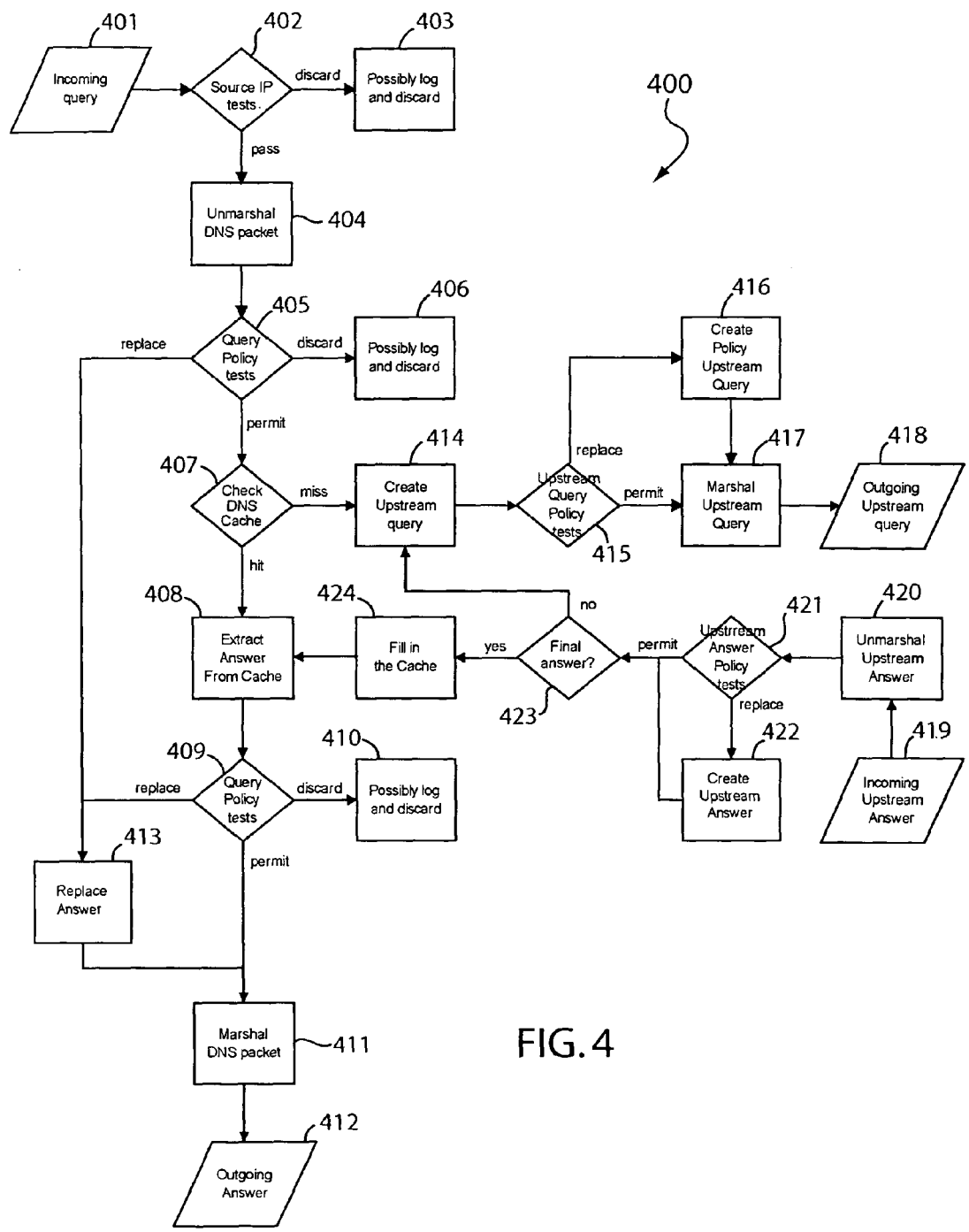
FIG. 4 shows a flow diagram of a method of responding to DNS client queries in accordance with an embodiment of the present invention.

FIG. 4 shows a flow diagram of a method 400 of responding to DNS client queries in accordance with an embodiment of the present invention. The method 400 may be performed by the DNS appliance 210.

The DNS appliance 210 receives an incoming DNS client query (see 401) from a customer computer 205 by way of the firewall 311 (shown in FIG. 3). The DNS server 312 checks the source IP addresses of one or more packets forming the client query (step 402). The DNS server 312 may either discard (to step 403) or continue processing of the client query (to step 404) based on one or more security policies 381. For example, a security policy 381 may indicate that only queries from particular IP addresses (e.g., those of authorized customer computers 205) may be processed, and client queries from any other IP addresses are to be discarded. As another example, a security policy 381 may indicate that client queries from IP addresses of known malicious sources should be logged for later reporting to the server 260 as telemetry data 382, and then discarded.

If the client query passes the source IP address test (see step 402), packets of the client query are unmarshaled by the DNS server 312 into a format supported by the DNS server 312 (step 404). The DNS server 312 then performs a first policy test (step 405) of several policy tests configured to determine whether the query is from a malicious source or would result in a prohibited action (e.g., navigation to a porn website by a company computer or a computer used by young children). That is, in essence, the first and subsequent policy tests checks the client query to determine if the originator of the client query is performing a prohibited (e.g., malicious or unauthorized) activity.

Each of the policy tests uses the then available information about the client query. As the processing of the client query continues, more information about the client query is known and accordingly checked against the security policies 381 at different stages of the processing. The policy tests may be updated in real time by receiving new or security policies 381 from the server 260 (see arrow 341 of FIG. 3) to allow for fast response against malicious threats as more information about them is discovered by the DNS appliance 210 during processing of the client query or by other DNS appliances 210 in the DNS security network. The security policies 381 may be different for different customers and thus accordingly identified. When a policy test is performed, the DNS appliance 210 may select the appropriate security policy 381 for the particular customer as identified by the client query's source IP address. Some security policies 381 may also be identified as global and thus applied to all client queries. The policy tests are referred to herein as first, second, etc. for ease of reference, and may be performed in different order depending on the application.

The first policy test (step 405) checks the client query for compliance with the security policies 381 using information about the client query as originally received in the DNS appliance 210. As originally received by the DNS server 312, the client query includes the source IP address of the customer computer 205 from which the client query came and the domain name of interest. In one embodiment, the first policy test checks the client query for compliance with customer-provided (see customer portal 505 of FIG. 5) security policies 381, such as restrictions on accessing web pages from particular websites, restrictions on sending emails to particular domain names, policy against sending of emails from a particular customer computer 205, and other policies a customer wants enforced. The DNS server 312 may replace an answer to the client query (to step 413), discard the client query (to step 406), or permit continued processing of the client query (to step 407) depending on the result of the first policy test.

The DNS server 312 may replace an answer to the client query if the first policy test indicates that the client query violates a security policy 381 and the security policy 381 dictates replacement of the answer (step 413). "Replacing an answer" means responding to the client query with an answer other than that that would result by normally processing the client query in accordance with established DNS processing standards as promulgated by the Internet Engineering Task Force (IETF) or other standard setting body. For example, if the answer to the client query includes an IP address of a prohibited website, the answer my be replaced with an IP address of a web page warning the user of the customer computer 205 that accessing web pages from the prohibited website is against company policy. As another example, if the answer includes an IP address of a known virus-infected website, the answer may be replaced with an IP address of a website that may perform a "house call" to disinfect the originator of the client query (i.e., customer computer 205 that originally sent the client query), which may already have been infected by the virus.

The DNS server 312 may discard the client query if the first policy test indicates that the client query violates a security policy 381 and the security policy 381 dictates discarding of the client query (step 406). The DNS server 312 may log the client query for telemetry data 382 collection purposes before discarding (e.g., stop further processing and delete from queue) the client query. A security policy 381 may dictate discarding client queries for a variety of reasons, including when the client query will involve going to a prohibited or infected computer and the customer prefers to simply discard the client query in that case.

If the client query passes the first policy test, the DNS server 312 checks the DNS cache 316 (see FIG. 3) for the answer (step 407). If the DNS cache 316 has the answer to the client query (i.e., a cache hit), the DNS server 312 extracts the answer from the DNS cache 316 (step 408) and performs a second policy test on the answer (step 409).

The second policy test (step 409) checks the client query for compliance with the security policies 381 using available information about the client query, which now additionally includes the "final answer" to the client query. The second policy test now has additional information about the client query and can take advantage of this additional information. For example, the second policy test may check the answer for IP addresses that may have been hijacked or belonging to known malicious computers. The second policy test may further check the answer for IP addresses that together with the client query and other client queries previously received by the DNS server 312 indicate that the originator of the client query itself is malicious. This may be due to the customer computer 205 that sent the query having been turned into a "zombie" or being controlled by malicious code, for example. This may also be due to an IP address of an authorized customer computer 205 being stolen or otherwise maliciously obtained. Malicious behavior may be indicated in a security policy 381 for reference by the DNS server 312. For example, a security policy 381 may indicate that an unreasonable amount of client queries from a single customer computer 205 for IP addresses of mail exchange servers within a short period of time may be deemed as coming from a malicious source (e.g., spammer or hacker performing a directory harvest attack or bounce-source attack). The second policy test may also repeat the first policy test because the security policies 381 used by the first policy test may have been updated by the server 260.

The DNS server 312 may replace the answer to the client query (step 413) if the second policy test (step 409) indicates that the client query violates a security policy 381, and the security policy 381 dictates replacement of the answer (step 413). For example, if the answer to the client query includes an IP address of a computer that is known to be spreading viruses, has been hijacked or taken over by malicious code (e.g., part of botnet), is operating as a phishing site, etc. the answer my be replaced with an IP address of a web page warning the user.

If the second policy test indicates the client query is part of malicious activity, the DNS server 312 may also replace the IP address in the answer with an IP address of a security site that may monitor the malicious activity for purposes of developing an antidote, creating a more reliable behavioral or signature pattern, collecting data (e.g., identify a control host for zombie computers), and so on. The security site may be a computer serving as a honey pot of an antivirus research facility, such as the TrendLabs™ global antivirus and research facility of Trend Micro, Inc., for example.

The DNS server 312 may discard the client query if the second policy test indicates that the client query, which now includes an answer, violates a security policy 381 and the security policy 381 dictates discarding of the client query (step 410). The DNS server 312 may log the client query for telemetry data 382 collection purposes before discarding the client query. A security policy 381 may dictate discarding client queries for a variety of reasons, including when originator of the client query is a malicious source with no known antidote at the moment, the answer points to a prohibited or infected site, and other reasons.

If the client query passes the second policy test, the DNS packets comprising the answer are marshaled (step 411) to put them in a standard form suitable for DNS communications. The answer (labeled as 412 in FIG. 4) is then forwarded to the originator of the client query.

It is possible that the DNS cache 316 does not contain an answer to the client query (i.e., a DNS cache miss; see step 407). In that case, the DNS server 312 may create an upstream query (step 414) to find the answer to the client query. In one embodiment, the DNS appliance 210 is configured to have at least one trusted, authoritative name server to send upstream queries.

A third policy test (step 415) checks the upstream query for compliance with the security policies 381 using available information about the client query, which may now additionally include a list of DNS servers. It is to be noted that the third policy test may be performed in several cycles of upstream queries and upstream answers. Therefore, the upstream query may now additionally include a list of DNS servers (recursive, root, or name DNS servers) involved in getting the final or intermediate (i.e., upstream answers before the final answer). The third policy test may check the upstream query for IP addresses of known malicious DNS servers, such as those operated, hijacked, or compromised by hackers.

If the third policy test (step 415) indicates the upstream query violates a security policy 381, and the security policy 381 dictates replacement of the upstream query, the DNS server 312 may replace the upstream query with a replacement upstream query (416) directed to a trusted (i.e., known good) DNS server. The replacement upstream query may be sent to the trusted DNS server to continue finding an answer to the client query.

The packets forming the upstream query (labeled as 418) are marshaled and sent to their destination upstream DNS server indicated in the upstream query (step 417). It is to be noted that at this point, the upstream query may be a replacement upstream query if it failed the third policy test (see path from step 415, to 416, then to 417).

Packets forming the upstream answer (labeled as 419) to the upstream query are marshaled (step 420) for processing by the DNS server 312. The upstream answer may come from the upstream DNS server to which the upstream query (see label 418) was sent.

A fourth policy test (step 421) checks the upstream answer for compliance with the security policies 381 using available information about the client query, which may now include the IP address of another DNS server with information on the answer or the final answer containing the IP address of the domain name of interest. The fourth policy test may check the upstream answer for IP addresses of known malicious or compromised DNS servers.

If the fourth policy test (step 421) indicates the upstream answer violates a security policy 381, and the security policy 381 dictates replacement of the upstream answer, the DNS server 312 may replace the upstream answer with a replacement upstream answer (step 422). The replacement upstream answer may include the IP address of a trusted DNS server, a web page informing the user the situation, or a security site serving as a honey pot of an antivirus research facility (for tracking or investigation). For example, if the originator of the query is found to be part of a phishing scam (e.g., tricking users to give sensitive information by misrepresentation), the replacement answer may give the IP address of a security site, instead of the control computer for the phishing, to gather more information about the scam. Otherwise, the upstream answer is permitted to be further processed (to step 423) if it passes the fourth policy test.

If the upstream answer is the final answer and contains the IP address of the domain name of interest (step 423), the upstream answer is entered into the DNS cache 316 (step 424), extracted from the DNS cache 316 (step 408), and further tested in the second policy test (step 409) before being marshaled (step 411) and forwarded to the originator of the client query as appropriate. Otherwise, if the upstream answer is not the final answer (step 423), another upstream query is created and the cycle continues until a final answer is obtained (step 414).

Figure 5:
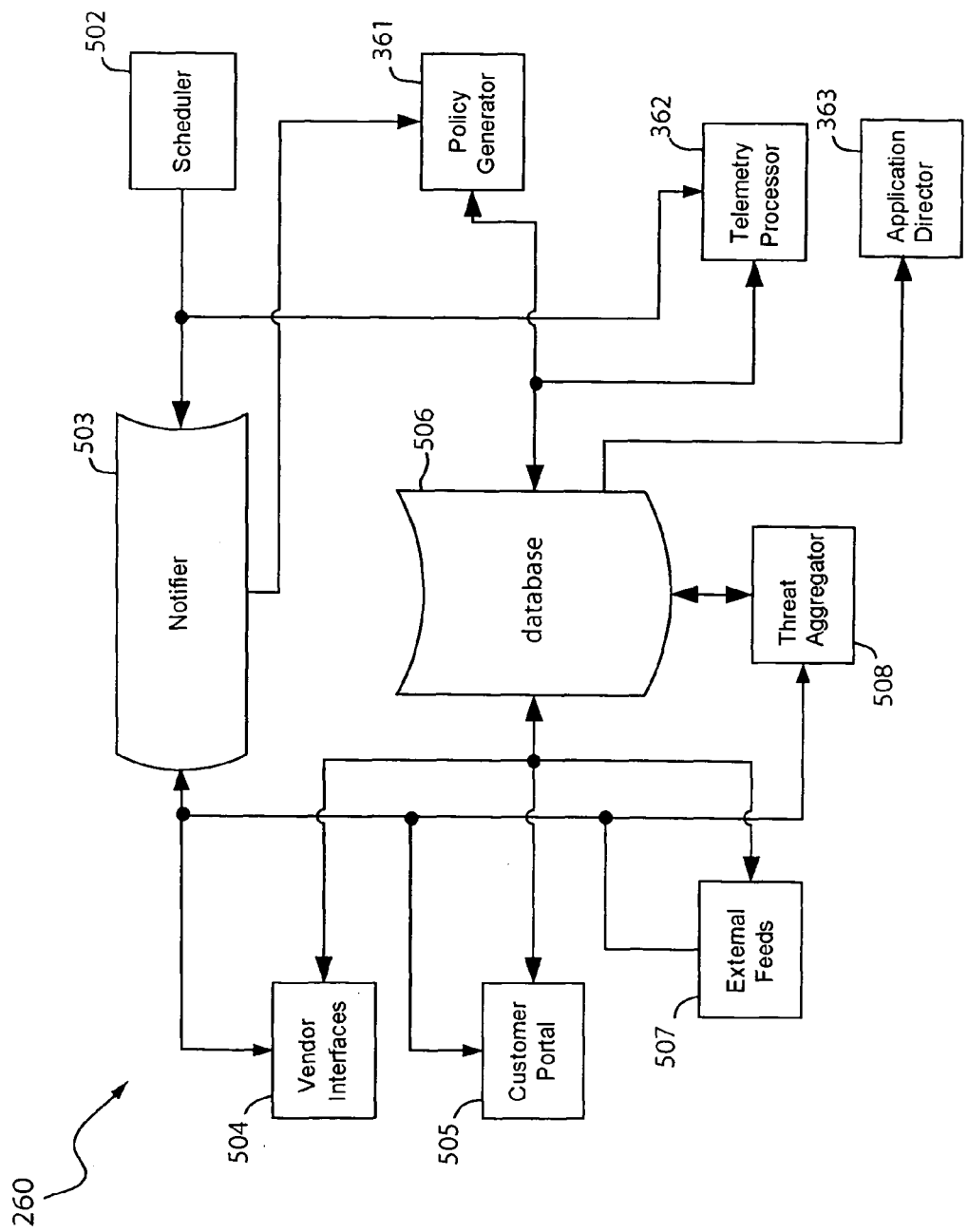
FIG. 5 schematically shows details of an SOC server in accordance with an embodiment of the present invention.

Referring now to FIG. 5, there is schematically shown details of the SOC server 260 in accordance with an embodiment of the present invention. In the example of FIG. 5, the SOC server 260 includes the policy generator 361, the telemetry processor 362, the application director 363, a scheduler 502, a notifier 503, vendor interfaces 504, a customer portal 505, a database 506, external feeds 507, and a threat aggregator 508.

The database 506 may comprise a commercially-available database, such as the PostgreSQL database. The database 506 provides data storage and retrieval facilities for the server 260. The database 506 is depicted as a single database in the example of FIG. 5, but may comprise two or more databases. A script or other computer-readable program code may be employed to format information from the vendor interfaces 504, the customer portal 505, the external feeds 507, and the threat aggregator 508 into one or more tables, each of which may be processed by the policy generator 361 to form corresponding security policies 381.

The telemetry processor 362 may comprise computer-readable program code for receiving telemetry data 382 from the DNS server 312 of the DNS appliance 210 (see FIG. 3) and storing the received telemetry data 382 in the database 506. In one embodiment, the telemetry processor 362 retrieves data collection rules from the database 306. Such data collection rules may identify the kinds of telemetry data 382 to be collected as specified by customers via the customer portal 505, by personnel of the vendor (i.e., operator and provider of the DNS security network) via the vendor interfaces 504, or by data collection configuration data stored in the database 306. For example, the data collection rules may indicate storage and processing of telemetry data 382 that includes specific information such as: DNS cache hit rates, amount of free memory, received client queries, answers to client queries, received upstream answers, DNS servers involved in getting an answer, violations of security policies 381, and/or other information to be logged in the database 506. The telemetry processor 362 may buffer all received telemetry data 382 into the database 506 and then remove from the database 506 those not meeting a data collection rule.

The application director 363 may comprise computer-readable program code for providing configuration information to the application manager 315 of the DNS appliance 210. As mentioned, this configuration information may include the IP addresses of customer computers 205 authorized to send DNS client queries to the DNS appliance 210, ports to listen on, listing of root or authoritative name servers, and other configuration/setup-related information. Configuration information may be entered in the database 506 by customers using the customer portal 505 or by vendor personnel using the vendor interfaces 504, for example. Configuration information may be unique to a group of DNS appliances 210 of a particular customer or to individual DNS appliances 210. The application director 363 may retrieve configuration information from the database 506 for download to a DNS appliance 210 upon request from a corresponding application manager 315, which acts as an agent for the application director 363.

The vendor interfaces 504 may comprise hardware and software components for allowing the vendor to control the operation of components of the DNS security network. In one embodiment, the vendor interfaces 504 comprise a secured communication link to allow vendor personnel to access the server 260 to specify collection of particular telemetry data 382 from a specified or all DNS appliances 210, to stop allowing particular customer computers 205 (e.g., of customers whose subscription has expired and not renewed) from accessing corresponding DNS appliances 210, to enter new tables of information into the database 506 for use as security policies 381, and other vendor-related actions.

The customer portal 505 may comprise hardware and software components for allowing a customer subscribing to the DNS security network to access the server 260 to enter configuration information (e.g., IP addresses of authorized customer computers 205) and security policies information (e.g., what security policy 381 to enforce and what to do if the security policy 381 is violated), and to view account information (e.g., billing, subscription duration). The customer portal 505 may provide web pages for data entry and viewing. For example, a customer with a web browser may navigate to a security policy entry web page of the customer portal 505 to indicate IP addresses of customer computers 205 not authorized to access prohibited websites and, when one of those customer computers 205 accesses a prohibited website, to specify redirection to a web page informing the user of the violation. Information entered into the security policy entry web page may be stored in the database 506 as a table for subsequent processing by the policy generator 361. Security policies 381 generated from customer inputs may be identified by a customer number (or other identification) so that they may be applied only against client queries from customer computers 205 of the particular customer.

The external feeds 507 may comprise hardware and software components for receiving threat-related information from sources other than the DNS security network. For example, a real-time black hole list ("RBL") of IP addresses of known malicious sources may be received by way of the external feeds 507. The real-time black hole list may come from a DNS reputation server, such as that from the Mail-Abuse Prevention System of Trend Micro, Inc., for example. As another example, a listing of known hijacked or stolen IP addresses may also be received over the external feeds 507. These IP addresses may be entered into the database 506 in the form of tables for later processing by the policy generator 361.

The threat aggregator 508 may comprise computer-readable program code for analyzing tables and telemetry data 382 stored in the database 506 to identify network security threats and to generate corresponding new tables for subsequent processing by the policy generator 361. The threat aggregator 508 may employ data mining and/or fraud analysis techniques to identify malicious activities that may otherwise be undetected if not for the capability of the server 260 to obtain telemetry data 382 from several DNS appliances 210 located in separate locations. The threat aggregator 508 may look for patterns of behavior indicative of malicious activity. For example, the threat aggregator 508 may be configured to be on the lookout for an excessive amount of client queries for the IP address of a particular domain, the client queries being received in a single DNS appliance 210 or several DNS appliances 210. Such a behavior is indicative of the client queries being from customer computers 205 that have been taken over by spyware, which tries to find the IP address of its malicious control server. As another example, the threat aggregator 508 may be configured to be on the lookout for excessive client queries for the IP addresses of mail exchange servers from a single customer computer 205, because such a behavior is indicative of a customer computer 205 being used to send spam. Once it identifies malicious activity by aggregating information stored in the database 506, the threat aggregator 508 may generate corresponding tables for subsequent processing by the policy generator 361.

The policy generator 361 may comprise computer-readable program code for retrieving policy-related tables (e.g., tables created by/from the vendor interfaces 504, customer portal 505, external feeds 507, and threat aggregator 508) from the database 506 and converting the tables into a format suitable for distribution as security policies 381. The policy generator 361 may forward the security policies 381 to the DNS appliances 210.

The notifier 503 may comprise computer-readable program code for forwarding instructions and/or notifications from one component of the server 260 to another. The notifier 503 provides a one-to-many and one-to-one notification function.

The scheduler 502 may comprise computer-readable program code for scheduling events in the server 260. For example, the scheduler 502 may be configured to periodically alert the policy generator 361 to send security policies 381 (if any are available) to the DNS appliances 210.

Figure 6:
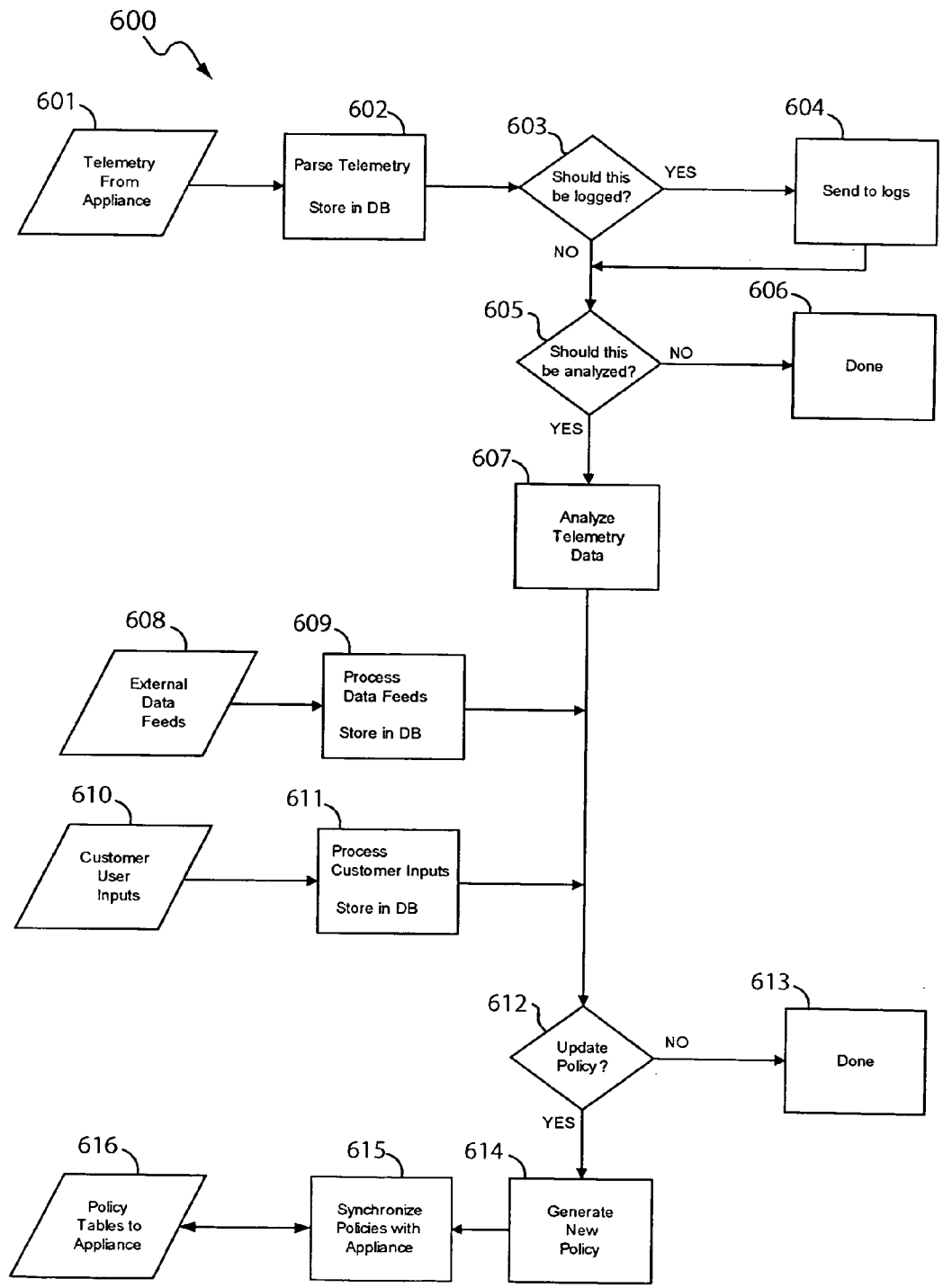
FIG. 6 shows a flow diagram of a method performed by an SOC server in accordance with an embodiment of the present invention.

FIG. 6 shows a flow diagram of a method 600 performed by an SOC server in accordance with an embodiment of the present invention. The method 600 is explained using previously described components of DNS appliances 210 (see FIG. 3) and the SOC server 260 (see FIG. 4). Other components may also be used without detracting from the merits of the present invention.

In the method 600, telemetry data 382 (labeled as 601 in FIG. 6) are received by the telemetry processor 362 from one or more DNS appliances 210. The telemetry processor 362 stores the telemetry data 382 in the database 506 and parses the telemetry data 382 (step 602) to determine if they should be logged according to telemetry data collection rules (step 603). If the telemetry data 382 are to be logged, an entry indicating receipt of the telemetry data 382 are noted in a log (step 604) in the database 506. If the collection rules indicate that the telemetry data 382 should be analyzed (step 605), the threat aggregator 508 inspects the telemetry data 382 (step 607) for information that by itself or when combined with other information stored in the database 306 is indicative of malicious activity. If the threat aggregator 508 identifies malicious activity, the threat aggregator 508 may generate a table containing information for identifying the malicious activity and what to do when the malicious activity is detected.

External data feeds (labeled as 608 in FIG. 6) are received by way of the external feeds 507 for storage in the database 506 (step 609). Similarly, customer inputs (labeled as 610 in FIG. 6) are received by way of the customer portal 505 for storage in the database 506 (step 611). The policy generator 361 checks the database 506 for information that may be used to make a new or updated security policy 381. If such information is available in the database 506 (step 612), the policy generator 361 generates a new or updated security policy 381 (step 614) and synchronizes security policies with the DNS appliances 210 (step 615) by forwarding them the new or updated security policy 381 (labeled as 616 in FIG. 6). Otherwise, if the database 506 does not contain new information that will result in a new or updated security policy 381, the SOC server 260 continues collection of threat-related information as before.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of processing a domain name system (DNS) client query sent to a DNS server, the method to be performed by the DNS server and comprising:

receiving in the DNS server a client query from a client computer, the client query requesting an Internet Protocol (IP) address associated with a domain name identified in the client query;

comparing a first set of information about the client query against security policies to determine if the client computer is performing a prohibited activity indicated in at least one of the security policies, the first set of information being with the client query as first received by the DNS server;

comparing a second set of information about the client query against the security policies to determine if the client computer is performing the prohibited activity, the second set of information including information that became available in the DNS server after the client query has been received in the DNS server;

determining an answer to the client query, the answer providing the IP address associated with the domain name identified in the client query; and replacing the answer with a different answer when the client computer is deemed to be performing the prohibited activity.

2. The method of claim 1 wherein the DNS server receives the security policies from a remotely located server computer and the server computer sends the DNS server updates to the security policies.

3. The method of claim 1 wherein the different answer provides an IP address for a web page that includes a warning about the prohibited activity instead of the IP address associated with the domain name identified in the client query.

4. The method of claim 1 wherein the prohibited activity comprises navigating to a prohibited website.

5. The method of claim 1 wherein the prohibited activity comprises sending spam emails.

6. The method of claim 1 wherein the prohibited activity comprises communicating with an external computer associated with malicious code in the client computer.

7. A system for processing DNS client queries, the system comprising:

a plurality of DNS appliances, each of the DNS appliances including a DNS server configured to process a DNS client query from a client computer, the DNS server being configured to check the DNS client query for compliance with security policies and to replace an answer to the client query with a replacement answer when at least one of the security policies indicate that the client computer is performing a prohibited activity, the answer comprising an IP address of a domain name of interest indicated in the client query as originally received by the DNS server; and a server computer configured to receive telemetry data from the plurality of DNS appliances, the telemetry data comprising information about client queries received by the DNS appliances, the server computer including a threat aggregator configured to detect a malicious activity based on the telemetry data from the plurality of DNS appliances, to generate an update to the security policies in response to the detection of the malicious activity, and to provide the update to the DNS appliances.

8. The system of claim 7 wherein the telemetry data comprises information about a violation of any of the security policies in one of the DNS appliances.

9. The system of claim 7 wherein the server computer includes a customer portal configured to allow a customer to configure at least one of the DNS appliances over the Internet.

10. A method of processing a DNS client query, the method comprising:
- in a server computer, receiving telemetry data from a plurality of DNS computers that each run a DNS server, the telemetry data including information about DNS client queries received by the DNS computers;
- in the server computer, generating a plurality of policies based on the telemetry data;
- providing the plurality of policies from the server computer to the DNS computers over the Internet;
- receiving a DNS client query in a DNS computer in the plurality of DNS computers, the DNS client query being originated by a customer computer requesting an IP address of a remote computer;
- in the DNS computer, checking the DNS client query against the plurality of policies to determine if the DNS client query is for a prohibited activity;
- in the DNS computer, determining an answer to the DNS client query, the answer including an IP address of the remote computer; and
- providing the customer computer a replacement answer instead of the answer when the client query is for the prohibited activity, the replacement answer being provided to the customer computer by the DNS server.

11. The method of claim 10 wherein at least one of the plurality of security policies identifies a pattern of behavior indicative of a prohibited activity.

12. The method of claim 10 wherein the replacement answer does not include the IP address of the remote computer.

* * * * *